United States Patent
Nishioka et al.

(10) Patent No.: US 6,206,658 B1
(45) Date of Patent: Mar. 27, 2001

(54) ORGANIC SUBSTANCE PROCESSING SYSTEM AND ORGANIC SUBSTANCE PROCESSING APPARATUS

(75) Inventors: Akira Nishioka, Tsuchiura; Hiroshi Kusumoto, Buzen; Keiji Sasao; Hiroshige Kikuchi, both of Chiyoda-machi; Takao Sato, Tokai-mura; Ryuichi Kaji, Tokyo; Shinji Aso, Tanashi; Hitoshi Kawajiri, Shiki; Satoshi Miyabayashi, Noda, all of (JP)

(73) Assignees: Hitachi, Ltd.; Hitachi Plant Engineering Co., Ltd., both of Tokyo (JP)

( * ) Notice: Subject to any disclaimer, the term of this patent is extended or adjusted under 35 U.S.C. 154(b) by 0 days.

(21) Appl. No.: 09/460,721

(22) Filed: Dec. 14, 1999

(30) Foreign Application Priority Data

Dec. 14, 1998 (JP) .................................. 10-355018

(51) Int. Cl.$^7$ .............................. F04B 17/00; F04B 35/00
(52) U.S. Cl. ............................................ 417/400; 210/603
(58) Field of Search ................................. 71/9; 210/669, 210/762, 603, 636, 748; 588/11; 264/109; 55/25; 417/425, 63, 53, 400; 110/246

(56) References Cited

U.S. PATENT DOCUMENTS

| | | | |
|---|---|---|---|
| 4,135,908 | * | 1/1979 | Widmer ...................................... 71/9 |
| 4,212,732 | * | 7/1980 | Fletcher et al. ....................... 210/669 |
| 4,294,706 | * | 10/1981 | Kakihara et al. ..................... 210/762 |
| 4,478,561 | * | 10/1984 | Elliston ................................ 417/400 |
| 4,627,794 | * | 12/1986 | Silva ..................................... 417/425 |
| 4,692,291 | * | 9/1987 | Angell ................................... 264/109 |
| 4,844,700 | * | 7/1989 | Henderson ............................ 417/425 |
| 4,940,544 | * | 7/1990 | Gode et al. ........................... 210/603 |
| 5,082,473 | * | 1/1992 | Keefer ..................................... 55/25 |
| 5,388,965 | * | 2/1995 | Fehn ........................................ 417/63 |
| 5,454,950 | * | 10/1995 | Li et al. ................................ 210/636 |
| 5,507,624 | * | 4/1996 | Fehn ........................................ 417/53 |
| 5,662,050 | * | 9/1997 | Angelo et al. ........................ 110/246 |
| 6,030,538 | * | 2/2000 | Held ..................................... 210/478 |

FOREIGN PATENT DOCUMENTS

| | | | |
|---|---|---|---|
| WO 99/04897 | * | 7/1998 | (DE) . |
| 5-11695 | | 5/1993 | (JP) . |
| 8-192199 | * | 7/1996 | (JP) . |

OTHER PUBLICATIONS

"The Development of Continuous Pipeline System Autoclave" by Yamasaki et al, a report of the Research Laboratory of Hydrothermal Chemistry, Faculty of Science Kochi University, vol. 3, pp. 1–4 (1979).

* cited by examiner

Primary Examiner—Teresa Walberg
Assistant Examiner—Leonid Fastovsky
(74) Attorney, Agent, or Firm—Evenson, McKeown, Edwards & Lenahan, P.L.L.C.

(57) ABSTRACT

Fluid containing organic substances, which has not processed yet, is fed to a plurality of cylinders, using a slurry pump. A free piston is included in each cylinder, the fluid which has not yet been processed is introduced into one of two chambers in the cylinder partitioned by the piston, and processed high-pressure fluid which has been processed is introduced into the other one of the two chamber in the cylinder. The piston pressurizes the fluid with which the cylinder has been filled up. A pressure holding valve is provided in a processed high-pressure fluid system to pressurize an organic substance processing system, and this pressure holding valve suppresses changes in the pressure in the processed high-pressure fluid system. By changing the timing of feeding the fluid before processing into each cylinder, it becomes possible to unbrokenly perform the filling-up of each cylinder with the fluid to be processed, the pressurizing of the fluid to be processed in each cylinder, and the feeding of the pressurized fluid to a reactor. Thus, stable continuous processing of the fluid to be processed can be realized.

19 Claims, 12 Drawing Sheets

ORGANIC SUBSTANCE PROCESSING SYSTEM AND ORGANIC SUBSTANCE PROCESSING APPARATUS

BACKGROUND OF THE INVENTION

The present invention relates to an organic substance processing system and an organic substance processing apparatus for heating fluid containing organic substances and oxidizing them, or changing then to oil or low molecular weight compounds, and especially relates to an organic substance processing system and an organic substance processing apparatus which continuously processes fluid containing organic substances.

A technique has recently been developed to oxidize sludge in sewage containing a lot of organic substances or drainage from factories, which also contains organic substances, by pressurizing and heating it to a pressure value and a temperature value beyond the critical levels (in the case of water, the pressure=22 Mpa, and the temperature=374° C.). A technique has also been developed to change sludge to oil below the critical conditions but under high pressure and high temperature conditions. Further, for recycling abandoned plastics, another technique is also known to decompose plastics with high molecular weight compounds in supercritical fluid and recover them as raw materials with low molecular weight compounds.

In every one of the above system, the processing of organic substances is performed by pressurizing fluid containing the organic substances to a high pressure level and heating it. A high-pressure slurry pump is generally used to pressurize fluid containing organic substances to a high pressure. However, a high-pressure slurry pump is a specialized pump and very expensive. Japanese Patent Application Laid-open Hei 5-111695 discloses a sludge pressing-in apparatus with a high-pressure water pump as a pressurizing apparatus in place of a slurry pump.

A method of reducing the power necessary to feed slurry at a high pressure is disclosed in "The Development of Continuous Pipeline System Autoclave" by Nakamich Yamasaki et al., A report of The Research Laboratory of Hydrothermal Chemistry, Faculty of Science Kochi University, Vol. 3, pp 1–4 (1979), which is referred to as a known literature.

Since processed fluid is pressurized to a high pressure level to oxidize organic substances in supercritical water, changes sludge to oil, or make plastics into low molecular weight compounds, a very large amount of power is necessary for the pump. In the method disclosed in the known literature, by using the pressure of the fluid in the reaction system for the back-pressure of the reaction system, the power driving the pump is reduced. However, according to this method, it is necessary to take new fluid to be processed into a cylinder, after the cylinder has been emptied by expelling the fluid to be processed in the reaction system from the cylinder. Therefore, fluid to be processed in the reaction system cannot be continuously fed from the cylinder to a reactor. Moreover, since a pressure regulation valve is located downstream from the cylinder, a great deal of auxiliary power is required to feed fluid into the cylinder while suppressing changes of pressure in the reaction system.

Further, as disclosed in Japanese Patent Application Laid-Open Nei 5-111695, when oxidization processing is performed in supercritical water, it is necessary to mix high-pressure oxygen gas into high-pressure fluid containing organic substances. If the flow rate of the fluid containing organic substances varies in this mixing process, the ratio of the oxygen gas to the fluid containing organic substances also changes. Accordingly, oxidization processing of organic substances does not uniformly occur. Furthermore, if the feed flow rate of the fluid containing organic substances changes, the residence time of the fluid in a preheater or a reactor varies, and the processing other than the oxidization processing also does not uniformly proceed. Thus, when fluid containing organic substances is fed at a high pressure, changes in the feed flow rate of the fluid must be suppressed as much as possible. The most effective method of suppressing changes of the feed flow rate of the fluid is to use a pump of a large capacity, which requires a very large amount of power for the pump.

SUMMARY OF THE INVENTION

The present invention has been achieved in consideration of the above described problems, and is aimed at decreasing the energy necessary to pressurize and feed fluid containing organic substances into an organic substance processing system and to stably operate a pressurization and feeding apparatus in the organic substance processing system.

Further, the present invention is aimed at continuously and stably feeding substances to be processed to a reactor in the organic substance processing system.

To attain the above objects, the present invention provides the first organic substance processing system for processing organic substances in a reactor by pressurizing fluid which contains organic substances with a plurality of cylinders including pistons, respectively, and by feeding the pressurized fluid into the reactor, this organic substance processing system comprising: a first chamber formed on one side of each cylinder, into which the fluid containing the organic substances is introduced; and a second chamber formed on the other side of the cylinder, into which processed high-pressure fluid is introduced, the organic substances in the fluid having been processed; wherein, by alternately changing the timing of pressurizing the fluid which contains the organic substances in each cylinder, the pressurized fluid is continuously fed to the reactor.

In the first organic substance processing system, a pressure holding means for maintaining the pressure in the second chamber into which the processed fluid is introduced, the organic substances in the fluid having been processed, and while one of the plurality of the cylinders feeds the fluid which has not yet been processed into the reactor, at lease one of the rest cylinders is being filled up with the fluid which has not yet been processed, and this fluid is then pressurized in the at least one of the rest cylinder.

Also, the present invention provides the second organic substance processing system comprising: cylinders including pistons, into which processed high-pressure fluid is introduced, organic substances contained in the processed high-pressure fluid having been processed; a feed means for feeding the fluid which has not yet been processed into the cylinders; a main pressurization means for pressurizing the fluid with a piston, which has not yet been processed, in at least one of the cylinders by introducing the processed high-pressure fluid into the cylinder; an auxiliary pressurization means for pressurizing the fluid which has not yet been processed in the cylinder along with the main pressurization means; and a pressure holding means for keeping the pressure of the fluid which has been processed at a predetermined pressure.

In the second organic substance processing system, the pressure holding means includes a back-pressure valve, and the processed high-pressure fluid is introduced into the cylinder after at least one of the pressure and the flow rate of the processed high-pressure fluid is reduced by the back-pressure valve.

Further, the second organic substance processing system includes a processing apparatus into which the pressurized fluid before processing is fed and which generates the processed high-pressure; and at least one pair of the cylinders; wherein the timing of filling-up and feeding of the fluid before processing in the pair of the cylinders is alternately changed, and by introducing the processed high-pressure fluid into the cylinders with the main pressurization means, the fluid containing the organic substances is continuously fed into the processing apparatus.

Furthermore, in the second organic substance processing system, each cylinder is partitioned into two chambers on both sides of the piston in the cylinder, the main pressurization means is connected to one chamber, the feed means is connected to the other chamber, and a piston swept volume of the chamber to which the main pressurization means is connected is smaller than that of the chamber to which the feed means is connected.

Moreover, in the second organic substance processing system, the pressure holding means includes a back-pressure valve for depressurizing the processed high-pressure fluid and introducing the fluid into the cylinder; each cylinder is partitioned into two chambers on both sides of the piston in the cylinder; the main pressurization means is connected to one chamber; the feed means is connected to the other chamber; a piston swept volume of the chamber to which the main pressurization means is connected is larger than that of the chamber to which the feed means is connected; a high-pressure pump is provided in the auxiliary pressurization means; and fluid pressurized by the high-pressure pump is introduced into one of the two chambers.

Still further, in the third organic substance processing system according to the second organic substance processing system, the cylinder includes a primary cylinder into which the processed high-pressure fluid is introduced and a secondary cylinder into which the fluid containing the organic substances before processing is introduced; a primary piston is provided in the primary cylinder; a secondary piston is provided in the secondary cylinder; and the primary and secondary pistons are connected to each other with a piston rod.

In the third organic substance processing system, a piston-rod-side chamber is formed on the back side of the secondary piston in the secondary cylinder; the piston rod is penetrating the secondary cylinder from the side of the piston-rod-side chamber to the outside of the secondary cylinder in a watertight state; and the fluid pressurized by the auxiliary pressurization means is fed into the piston-rod-side chamber.

Further, the third organic substance processing system includes a motor for driving the piston rod and transmission means for transmitting rotational force of the motor to the piston rod.

In addition, the present invention provides the fourth organic substance processing system comprising: a cylinder including a piston for pressurizing fluid containing organic substances, which has not yet been processed; a main pressurization means for introducing processed high-pressure fluid into the piston, which has been processed; an auxiliary pressurization means for pushing the piston along with the main pressurization means; a back-pressure line for introducing the processed high-pressure fluid into one of two chambers in the cylinder partitioned by the piston; a back-pressure-line pressure holding valve for keeping the pressure in the back-pressure line below a predetermined pressure by expelling a part of the high-pressure fluid which has been processed from the back-pressure line when the pressure in the back-pressure line exceeds the predetermined pressure; a pre-pressurization line for introducing the part of the processed high-pressure fluid expelled from the back-pressure line into the chamber in the cylinder partitioned by the piston; and a pre-pressurization-line pressure holding valve for keeping the pressure in the pre-pressurization line below a predetermined pressure by expelling a part of the processed high-pressure fluid from the pre-pressurization line when the pressure in the pre-pressurization line exceeds the predetermined pressure.

Also, in the fifth organic substance processing system according to the fourth organic substance processing system, the back-pressure line includes first valve means; the pre-pressurization line includes second valve means; and when the chamber in the cylinder is pressurized from a state of the atmospheric pressure, the back-pressure line is closed by the first valve means, and the pre-pressurization line is opened by the second valve means.

Further, the fourth organic substance processing system includes a fluid feeding pump for feeding fluid which has not yet been processed into the other one of the two chambers in the cylinder partitioned by the piston; a first valve means provided in the back-pressure line; and a second valve means provided in the pre-pressurization line; wherein when the fluid which has not yet been processed is fed into the other one of the two chambers in the cylinder, the back-pressure line is opened by the first valve means, and the pre-pressurization line is closed by the second valve means.

Also, in the sixth organic substance processing system according to the fourth organic substance processing system, a reactor for processing the fluid pressurized in the cylinder is provided; a reaction-system-pressure holding valve is provided between the reactor and the back-pressure-line pressure holding valve; the processed high-pressure fluid expelled from the reaction-system-pressure holding valve is introduced into the back-pressure line.

Furthermore, the fourth organic substance processing system includes a different piston connected to the piston via a piston rod; a different cylinder including the different piston; a pressurization pump for introducing pressurized operation-fluid into the different cylinder; a different pre-pressurization line for introducing the processed high-pressure fluid expelled from the pre-pressurization-line pressure holding valve into the different cylinder; and a different pre-pressurization-line pressure holding valve; wherein when the different cylinder is pressurized from a state of the atmospheric pressure, the inside of the different cylinder is pressurized by the processed high-pressure fluid which has passed through both the reaction-system-pressure holding valve and the pre-pressurization-line pressure holding valve.

Moreover, in the fifth organic substance processing system, a reactor for processing the fluid pressurized in the cylinder is provided; a reaction-system-pressure holding valve is provided between the reactor and the back-pressure-line pressure holding valve; the processed high-pressure fluid expelled from the reaction-system-pressure holding valve is introduced to the back-pressure line.

Still further, in the sixth organic substance processing system according to claim 15, an accumulator is provided in the back-pressure line.

DETAILED DESCRIPTION OF THE EMBODIMENTS

Figure 1:
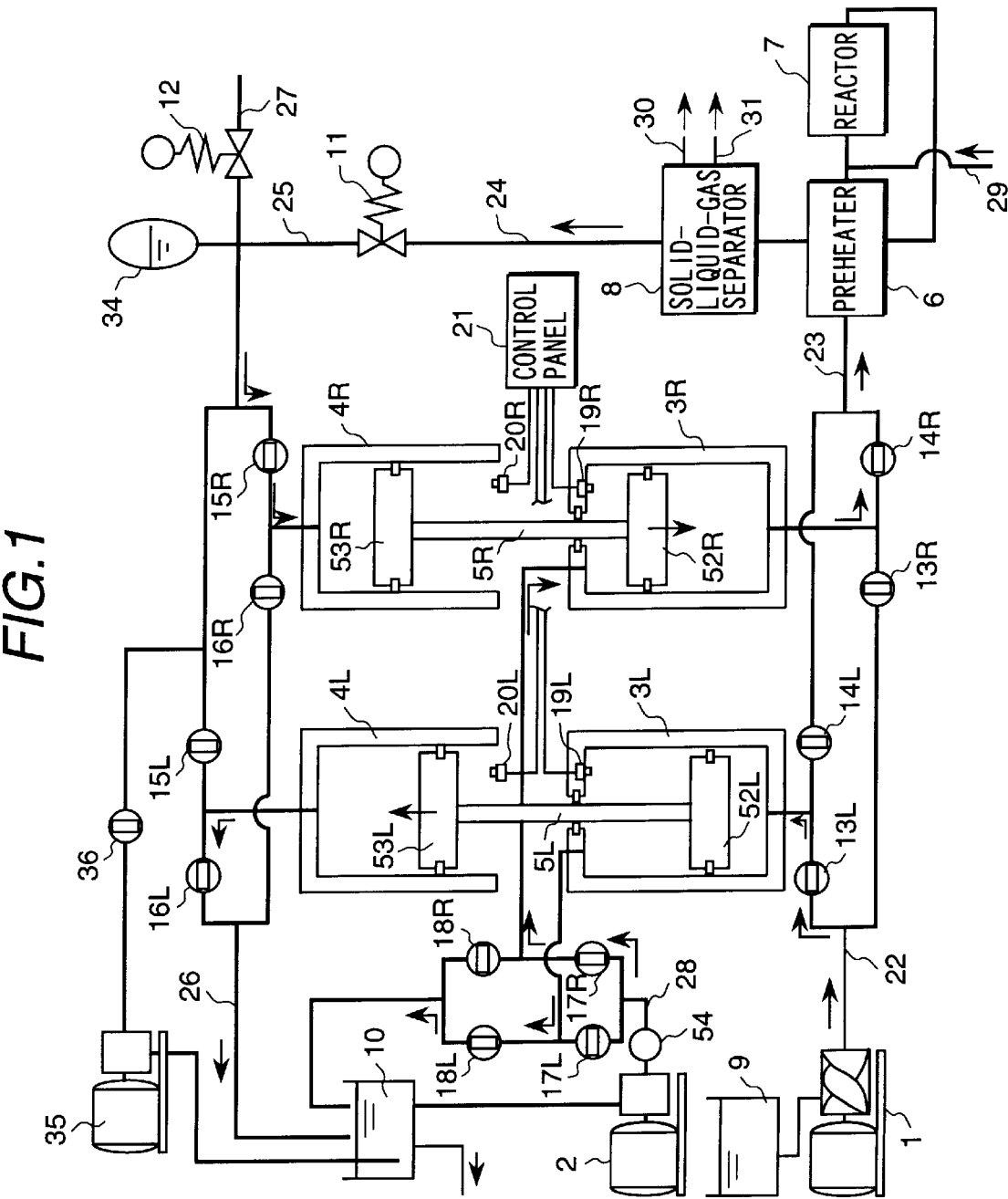
FIG. 1 is a schematic block diagram showing the composition of an organic substance processing system of an embodiment according to the present invention.

Hereafter, the embodiments will be explained in detail with reference to the drawings. FIG. 1 shows the composition of an organic substance processing system of an embodiment according to the present invention, in which slurry containing organic substances is heated and pressurized to a high-temperature and pressure, and then oxidized. In the organic substance processing system, two pairs of free-piston-type cylinders are provided. Fluid obtained after processing is introduced into one side piston of the one pair, and fluid which has not yet been processed is sucked, pressurized, and expelled from the other side piston of the pair, using the pressure of the fluid introduced after the processing. The slurry containing organic substances is continuously processed by making the two pairs of the pistons alternately perform the sucking and expelling operations. Operations of the organic substance processing system of this embodiment are explained below.

High-pressure water 25 obtained after the processing is introduced in to the primary side cylinders 4L and 4R via valves 15L and 15R, respectively. This high-pressure water 25 is expelled from the primary pistons 4L and 4R into an operation-water tank 10 as operation-water 26 via valves 16L and 16R. Slurry which has not yet been processed is sucked into the secondary side cylinders 3L and 3R via valves 13L and 13R, respectively. The high-pressure slurry 23 pressurized by the secondary cylinders 3L and 3R is fed into a preheater 6, and further into a reactor 7 via valves 14L and 14R, respectively. Operation-water 28 is fed into spaces on the sides of piston-rods 5L and 5R of the secondary cylinders 3L and 3R from a flow control valve 2 via valves 17L and 17R, respectively. This operation-water 28 is returned to the operation-water tank 10 via valves 18L and 18R.

The organic substance processing system shown in FIG. 1 is in a processing state such that the left cylinder 3L is being filled up with slurry 22 from a slurry tank 9, and high-pressure slurry 23 pressurized by the right cylinder 3R is being fed into the preheater 6.

The operations of the left cylinder 3L are described below. A slurry pump 1 operated, the valve 13L is activated, and the valve 14L is closed. Further, the valve 17L is closed, and the valve 18L is opened. When the piston 52L rises, the operation-water 28 in the space on the side of the piston-rod 5L of the cylinder 3L is pressurized and returned to the operation-water tank 10. In this process, the valve 15L is closed, and the valve 16L is opened. The pressure in the cylinder 4L becomes the same as the atmospheric pressure. When a piston 53L connected to the piston 52L with the piston-rod 5L rises, the operation-water 26 in the cylinder 4L is expelled to the operation-water tank 10.

Next, the operations of the right cylinder 3R are described below. The flow control pump 2 is activated, the valve 17R is opened, and the valve 18R is closed. The operation-water 28 flows into a space on the side of a piston-rod 5R of the cylinder 3R. The piston 52R is pushed and lowered by the flowing-in of the operation-water. Further, the valve 13R is closed, and the valve 14R is opened. The slurry in the cylinder 3R is pressurized, and is fed into the preheater 6 as the high-pressure slurry 23. In this process, the valve 15R is opened, and the valve 16R is closed. The high-pressure water obtained after the processing flows into the cylinder 4R, and the back-pressure is applied to the piston 53R. Since the pressure of the high-pressure water and the pressure of the operation-water 28 are applied to the pistons 53R and 52R, respectively, the combined pressure is applied to the piston 52R connected to the piston 53R with the piston-rod 5R. The slurry fed from the slurry pump 1 is changed into the high-pressure slurry 23 by this combined pressure. The displacement of the piston 52R is determined by the amount of the operation-water which has flowed into the cylinder 3R. Therefore, the feed flow rates of the high-pressure slurry 23 is controlled by controlling the discharge flow rate from the flow control pump 2.

After the high-pressure slurry 23 fed into the preheater 6 is heated by the preheater 6, the high-pressure slurry 23 is mixed with hydrogen 29, and is oxidized in the reactor 7. The fluid of the slurry 23 processed with the oxidization reaction is returned to the preheater 6, and exchanges heat with the fluid of the slurry 23 which has not yet been processed. Further, the fluid of the processed slurry 23 whose temperature is decreased by the heat-exchange is sent to a solid-liquid-gas separator 8. In the solid-liquid-gas separator 8, exhaustion gas 30 and ash 31 included in the fluid of the processed slurry 23 are separated and expelled.

The high-pressure water 24 which includes only liquid obtained by removing the exhaustion gas 30 and the ash 30 from the fluid of the processed slurry 23 is passed through a reaction-system-pressure holding valve 11, and is depressurized to the preset pressure of a back-pressure holding valve 12. A part of the depressurized processed high-pressure water 25 is expelled as processed exhaustion-water 27 via the back-pressure holding valve 12. Most of the rest of the depressurized processed high-pressure water 25 flows into the cylinder 4R, and is used to pressurized the slurry 22 in the space 65R (referred as to the chamber 65R). The amount of the ash 31 separated from the fluid of the processed high-pressure slurry 23 changes depending on the amount of organic substances contained in the high-pressure slurry 23. Further, the flow rate of the processed high-pressure water 25 also changes. Thus, the amount of the processed exhaustion-water 27 is adjusted so that the amount of the depressurized processed high-pressure water 25 which flows into the cylinders 4L and 4R does not change.

The reaction-system-pressure holding valve 11 keeps the pressure in the region from the preheater 6 to the solid-liquid-gas separator 8 constant. However, it is possible to use the back-pressure holding valve 12 as a system-pressure holding valve without providing the reaction-system-pressure holding valve 11. However, in this composition, since changes in the processed high-pressure water 25 due to operations of the valves 15L and 15R propagate in the whole reaction system, which may cause a pulsation flow of the processed high-pressure water 25, it is necessary to carefully operate the valves 15L and 15R.

If the reaction-system-pressure holding valve 11 is used, it is necessary to create the difference between the pressure before and after the reaction-system-pressure holding valve 11. However, if the pressure of the processed high-pressure water 25 is decreased, the driving force of the pistons 53L and 53R decreases, and the pressure of the operation-water 28 must be increased. Further, if the pressure of the operation-water 28 is increased, the power for the flow control pump 2 must be increased. Therefore, it is desirable not to increase the difference between the pressure in the back-pressure holding valve 12 and that in the reaction-system pressure holding valve 11 more than it is necessary.

Since the strokes of the pistons 52L and 52R in the secondary cylinders 3L and 3R are equal to those of the pistons 53L and 53R in the primary cylinders 4L and 4R, respectively, the flow rate of fluid flowing into the cylinder 4R is also equal to that of fluid flowing out of the cylinder 3R. Thus, the system is operated so that even if the flow rate of the processed high-pressure water 25 changes, the flow rate of fluid flowing into the cylinder 4R does not change. That is, in the usual operation, a certain amount of the processed high-pressure water 25 is expelled as the processed exhaustion-water 27 via the back-pressure holding valve 12. By this operation, it is possible to compensate for the change in the flow rate of the processed high-pressure water 25 by adjusting the flow rate of the processed exhaustion-water 27 which is expelled from the back-pressure holding valve 12, if the flow rate of the processed high-pressure water 25 changes. On the other hand, the instantaneous change in the pressure is absorbed by an accumulator 34.

A cross-sectional area of each primary cylinder is determined by the volumetric flow rate of fluid flowing into the primary cylinder. If the volumetric flow rate of fluid flowing into each primary cylinder is lower than the volumetric flow rate of the high-pressure slurry 23, the cross-sectional area of each primary cylinder is made smaller than that of each secondary cylinder. If the cross-sectional area of each primary cylinder becomes smaller, the drive force generated by the piston of each primary cylinder becomes also smaller. Accordingly, it is necessary to increase the pressure of the operation-water 28 by the amount of the decrease in the cross-sectional area of each primary cylinder. Thus, it is desirable to suppress the flow rate of the processed exhaustion-water 27 to be expelled from the back-pressure holding valve 12 as much as possible.

When the organic substance processing system is started, the whole processing system is pressurized with an initial pressurization pump 35. After the pressurization of the processing system is completed, the initial pressurization pump 35 is stopped, and the valve 36 is closed.

Figure 2:
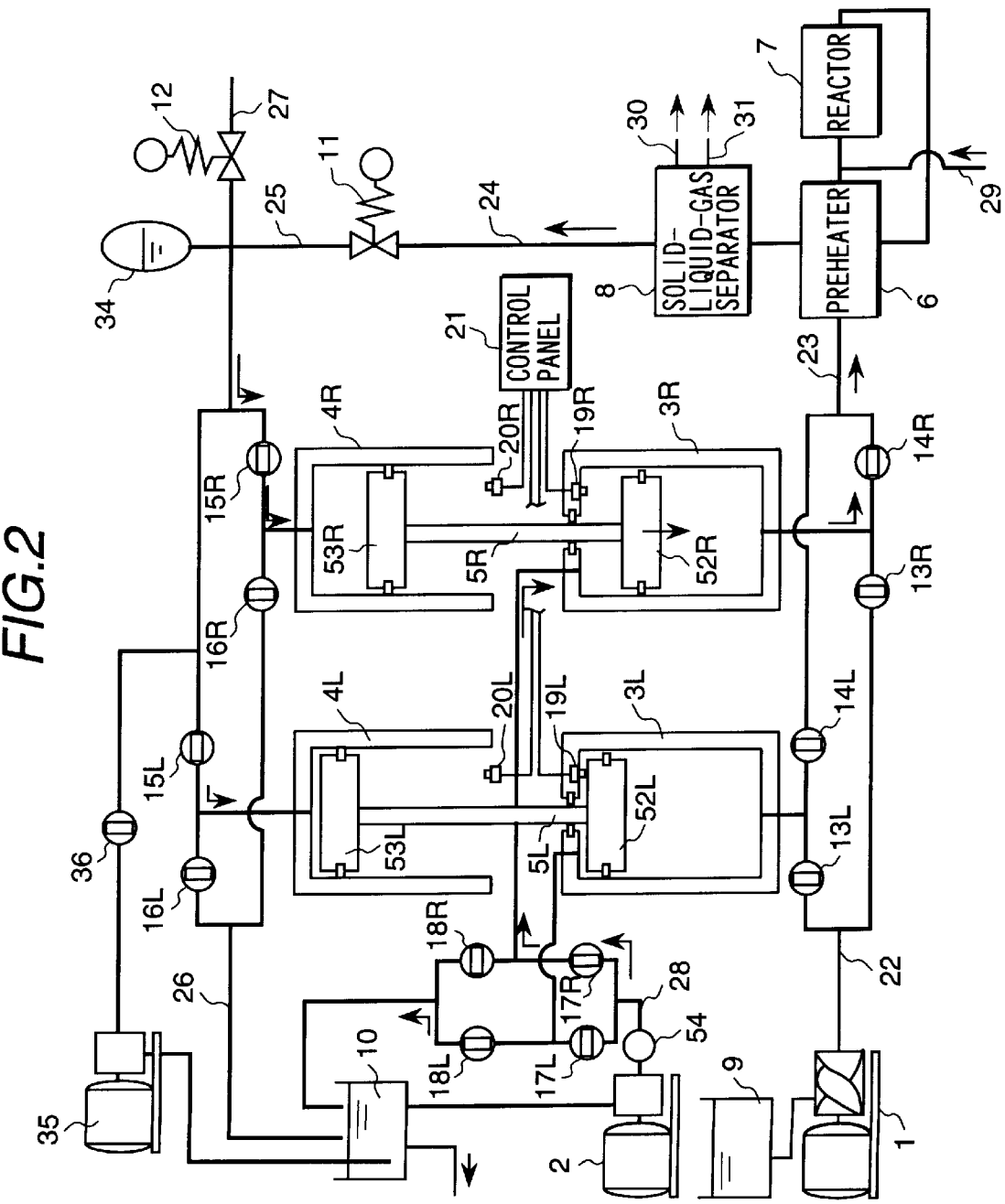
FIG. 2 is a schematic block diagram showing the composition of an organic substance processing system of another embodiment according to the present invention.

Operations performed after the cylinder 3L is filled up with the slurry 22 will be explained with reference to FIG. 2. While the cylinder 3L is being filled up with the slurry 22, the piston 52L is rising. When the piston 52L reaches the top-dead-point, the detector 19L sends a top-dead-point confirmation signal to the control panel 21. Further, when the control panel 21 receives the top-dead-point confirmation signal, the control panel 21 stops the slurry pump 1, and the valves 13L and 16L are closed.

Next, the control panel 21 opens the valve 15L to apply the pressure of the processed high-pressure water 25 to the piston 53L. Since the pressure in the cylinder 4L is the same as the atmospheric pressure before the valve 15L is opened, the pressure of the processed high-pressure water 25 instantaneously decreases when the valve 15L is opened. If the decrease in the pressure is large, the drive force of the piston 53R also has a large decrease, which may cause a pulsation flow in the flow of the fed slurry 23. Changes in the pressure of the processed high-pressure water 25 are suppressed by the accumulator 34.

Here, high-pressure gas is charged in the upper space of the accumulator 34, and the processed high-pressure water 25 is introduced into the lower space of the accumulator 34. When the valve 15L is opened, and the pressure of the processed high-pressure water 25 decreases, the high-pressure gas in the accumulator 34 expands and pushes the processed high-pressure water 25 out of the accumulator 34. Consequently, the decrease in the pressure in the processed high-pressure system is very small, and the generation of a pulsation flow can be prevented.

When the pressure of the processed high-pressure water 25 is applied to the piston 53L, the slurry 22 filled up in the cylinder 3L is pressurized to a high pressure level. Thus, the slurry 22 pressurized in the cylinder 3L is fed into the reactor 7. The pressurized slurry 22 (high-pressure slurry 23) is continuously fed to the reactor 7 from the cylinder 3L, and if the piston 53R reaches the bottom-dead-point, the detector 20R sends a bottom-dead-point confirmation signal to the control panel 21. When the control panel 21 receives the bottom-dead-point confirmation signal, the control panel 21 open the valve 14, and operates the valves 17L, 17R, 18L, and 18R to change their opening/closing states to the states opposite to the those which they had previously been in. Consequently, the high-pressure slurry 23 is fed into the reactor 7 from the cylinder 3L.

Figure 3:
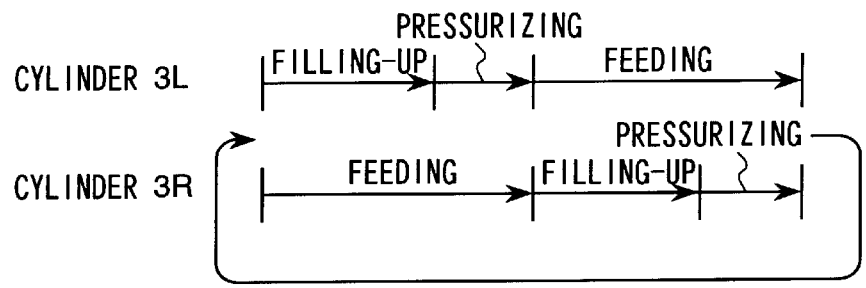
FIG. 3 is an illustration for depicting an operational cycle of the embodiment shown in FIG. 1.

FIG. 3 is an illustration for depicting an operational cycle of the embodiment shown in FIG. 1. While the high-pressure slurry 23 is fed to the reactor 7 from the cylinder 3R, the cylinder 3L is filled up with the slurry 22, and the filled-up slurry 22 is pressurized to a high pressure level. When the feeding of all of the high-pressure slurry 23 in the cylinder 3R into the reactor 7 is completed, the feeding of the high-pressure slurry 23 into the reactor 7 from the cylinder 3L is started. Here, slightly before the feeding of all of the high-pressure slurry 23 in the cylinder 3R into the reactor 7 is completed, the feeding of the high-pressure slurry 23 into the reactor 7 from the cylinder 3L is started. By setting a period for which the high-pressure slurry 23 is fed from the cylinders 3L and 3R in parallel, switching between the feeding of the slurry 23 from the cylinder 3L and the feeding of the slurry 23 from the cylinder 3R can be smoothly carried out. The flow control pump 2 also lets the operation-water 28 flow with a constant flow rate during the switching of the feeding mode. By this operation of the flow control pump 2, it is possible to keep the flow rate of the fed high-pressure slurry 23 constant.

Meanwhile, the detector 19R generates the top-dead-point confirmation signal when the piston 5R reaches the topdead-point, and the detector 20L generates the bottom-dead-point confirmation signal when the piston 5L reaches the bottom-dead-point. The control panel 21 switches the feeding mode by referring to the confirmation signals.

The control panel 21 controls the flow rate of the fed high-pressure slurry with the control performed by the flow control valve 2 in addition to the control performed by the above valves. The flow rate of the operation-water 28 fed to the cylinders 3L and 3R from the flow control pump 2 is detected by the flowmeter 54. The flow control pump 2 is controlled so that the detected flow rate of the operation-water 28 is equal to the desired value for the flow rate of the fed high-pressure slurry. Also, it is possible to control the flow rate of the operation-water 28 based on the detected flow rate of the processed high-pressure water 25 flowing into the primary cylinders 4L and 4R.

Figure 4:
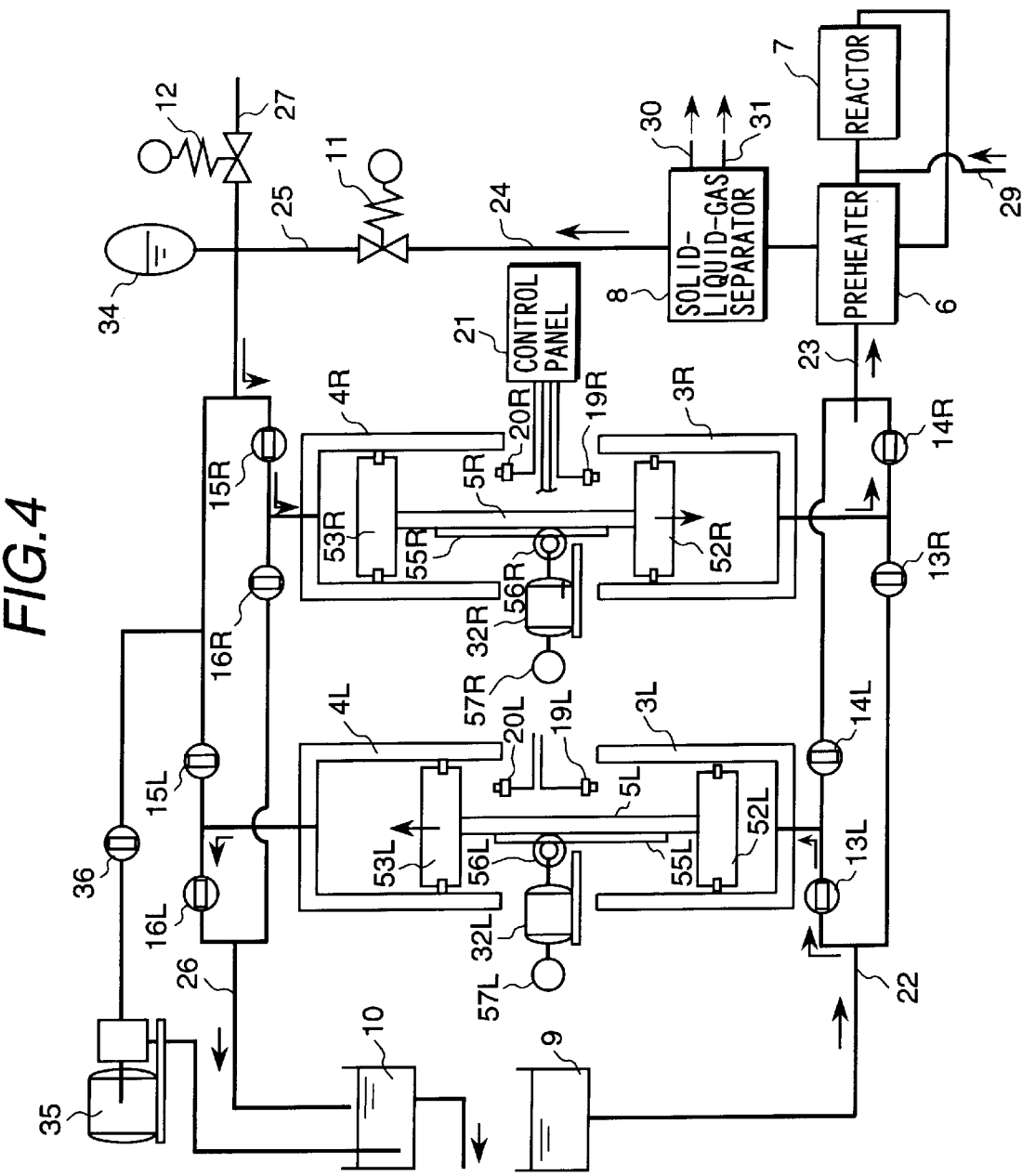
FIG. 4 is a schematic block diagram showing the composition of a modified organic substance processing system of the embodiment shown in FIG. 1.

FIG. 4 shows the composition of a modified organic substance processing system of the embodiment shown in FIG. 1. This embodiment is different from the above embodiments in that the pistons 52L, 52R, 53L, and 53R are driven by motors 32L and 32R in place of the flow control pump 2. The cylinders 3L and 3R are open at positions on the sides of the pistons 5L and 5R, onto which racks 55L and 55R are attached, respectively. The rotational force of the motors 32L and 32R are transmitted to the pistons 52L and 52R via the racks 55L and 55R engaged with pinions 56L and 56R attached to rotation axes of the motors 32L and 32R, respectively. The pistons 52L and 52R are driven independently of each other. Meanwhile, since the motors 32L and 32R can raise the pistons 52L and 52R, the slurry pumps are not necessary.

When the cylinder 3L is filled up with the slurry 22, the pressure of the slurry becomes a negative pressure with respect to the atmospheric pressure. Therefore, in order to prevent air from intermixing into the slurry 22, it is desirable to locate the slurry tank 9 at a higher position then that at which each of the cylinders 3L and 3R are located.

Although the rotational motion of each of the motors 32L and 32R is converted to the linear motion of each of the pistons 52L and 52R, using the racks and the pinions, in this modified organic substance processing system, it is possible to use a screwed axis method or a ball thread method in which the piston rods 5L and 5R are shaped as screwed axes. Also, it is possible to compose the piston rods 5L and 5R as linear motors, respectively.

In order to control the flow rate of the fed high-pressure slurry, the relationship between the displacement of each of the pistons 52L and 52R and the flow rate of the expelled-out high-pressure slurry is obtained in advance. The rotational speed of each of the motors 32L and 33R is detected by the corresponding rotational speed detectors 57L and 57R, and the drive speed of each piston rod (each piston) is controlled so that the flow rate of the expelled-out high-pressure slurry is equal to the desired value. Moreover, it is also possible to control the flow rate of the fed high-pressure slurry by detecting the flow rate of the processed high-pressure water 25 flowing into the cylinder 4L and 4R.

Figure 5:
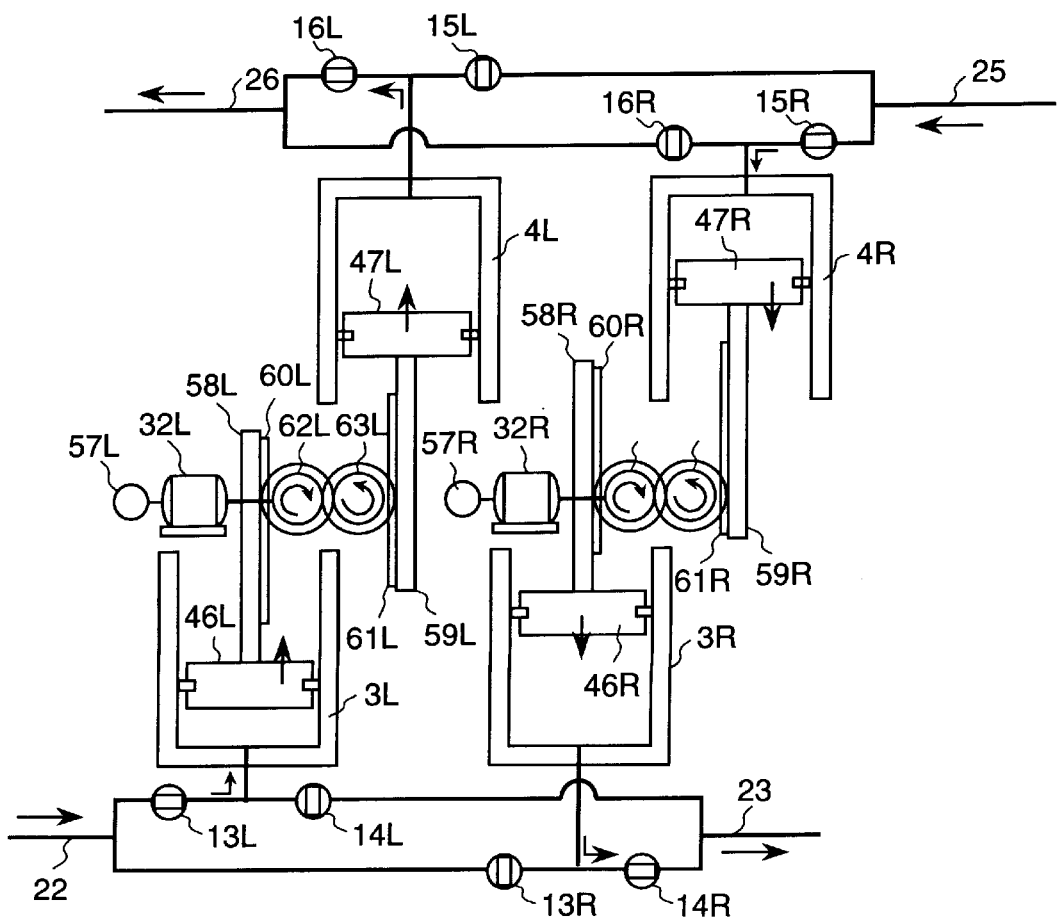
FIG. 5 is a schematic block diagram showing the composition of another modified organic substance processing system of the embodiment shown in FIG. 1.

FIG. 5 shows the composition of another modified organic substance processing system of the embodiment shown in FIG. 1. This modified organic substance processing system is different from the previous processing systems in that each piston rod for moving the primary and secondary cylinders together is divided into two piston rods, and a gear is provided between the two piston rods.

Racks 60L, 60R, 61L, and 61R are attached to piston rods 58L, 58R, 59L, and 59R, which are connected to pistons 46L, 46R, 47L, and 47R, respectively. The drive force caused by the pistons 47L and 47R in the respective primary cylinders 4L and 4R is transmitted to the pistons 46L and 46R in the respective secondary cylinders 3L and 3R via the racks 58L–61R, and the gears 62L, 62R, 63L, and 63R, respectively. According to this modified processing system, the gears 62L and 62R between the respective pairs of the racks can also be used as gears for transmitting the drive force of the respective motors 32L and 32R.

In this embodiment, the drive force obtained by each of the primary cylinders 4L and 4R is transmitted to the corresponding one of the secondary cylinders 3L and 3R, using the racks and the pinions. Since the displacement speed of each piston is proportional to the rotational speed of each gear, a variation in the displacement speed of each piston does not occur, and the high-pressure slurry 23 can be fed at a constant flow rate.

Figure 6:
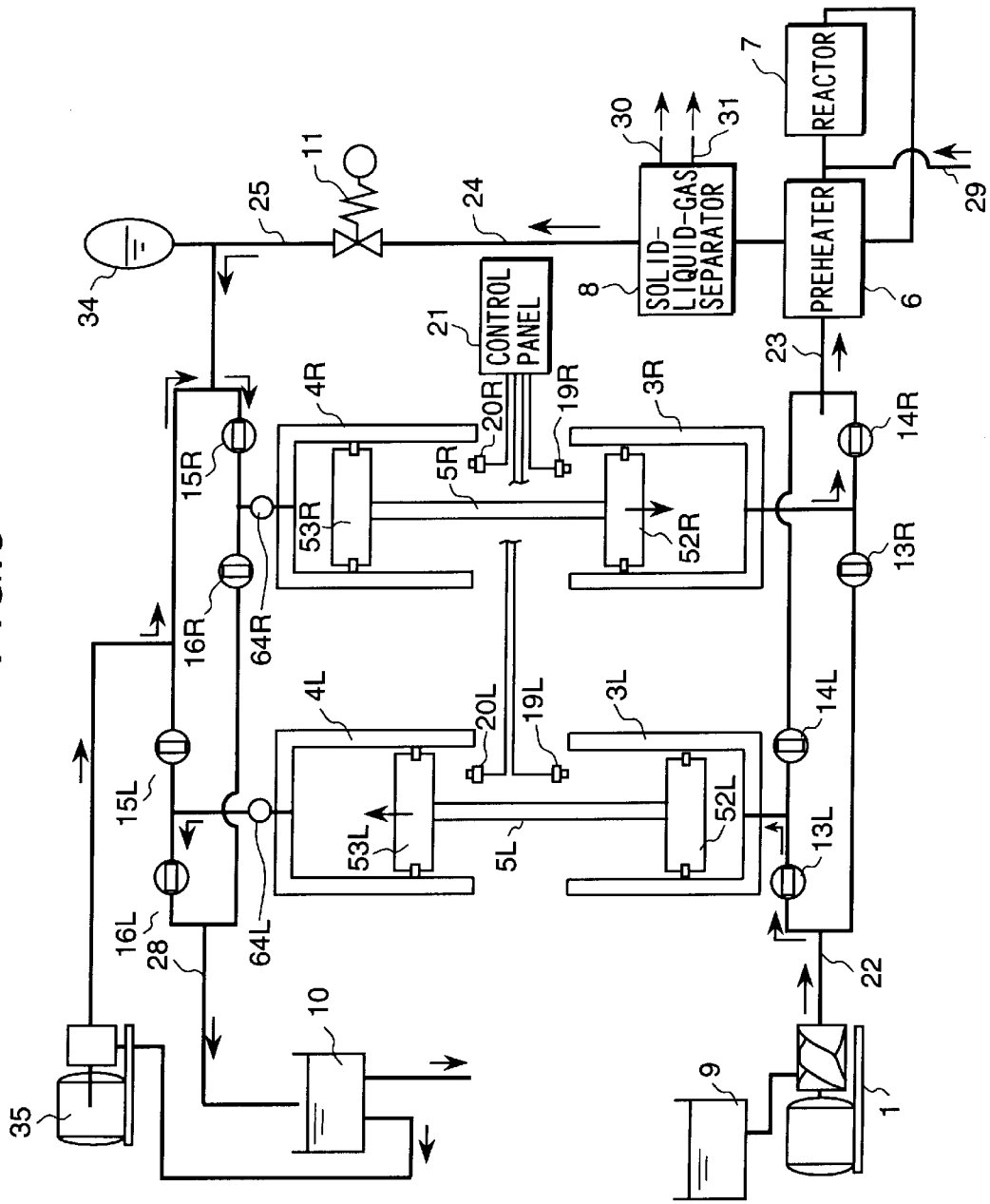
FIG. 6 is a schematic block diagram showing the composition of still another modified organic substance processing system of the embodiment shown in FIG. 1.

FIG. 6 shows the composition of another modified organic substance processing system of the embodiment shown in FIG. 1. This modified organic substance processing system is different from the processing system shown in FIG. 1 in that the operation-water 28 discharged from the high-pressure pump 35 is mixed with the processed high-pressure water 25. Meanwhile, although FIG. 1 does not show the relationship between the cross-sectional area of each of the cylinders 4L and 4R and that of the corresponding one of the cylinders 3L and 3R, the cross-sectional area of each of the cylinders 4L and 4R is larger than that of the corresponding one of the cylinders 3L and 3R in this modified processing system.

The force applied to a piston is the product of its cross-sectional area and the pressure of the fluid acting on the piston. Therefore, even if the pressure of the processed high-pressure water 25 is decreased below that of the high-pressure slurry 23, it is possible to pressurize the slurry 22 and feed it into the reactor 7 if the effect of increasing the cross-sectional area of each of the cylinders 4L and 4R over that of the corresponding one of the cylinders 3L and 3R exceeds the effect of decreasing the pressure of the processed high-pressure slurry 23. In this embodiment, since the back-pressure applied to the pistons of the respective cylinders 3L and 3R is not required, each of the cylinders 3L and 3R can be composed such that the side of the cylinder in each of the cylinders 3L and 3R is opened.

The discharge pressure of the high-pressure pump 35 is equal to that of the processed high-pressure water 25. Further, the pressure of the high-pressure water 25 is lower than that of the high-pressure water 24. Accordingly, the water discharged from the high-pressure pump 35 does not flow into the region of the processed high-pressure water 24.

Even if the flow rate of the processed high-pressure water 25 changes, since it is possible to match the change in the flow rate by changing the flow rate of the fed high-pressure slurry 23, a back-pressure holding valve is not necessary. The control panel 21 keeps the discharge flow rate of the high-pressure pump 35 constant, so that the flow rate of the fed high-pressure slurry 23 does not change. For this purpose, flowmeters 64L and 64R detect the flow rate of the fed high-pressure slurry 23 by measuring the displacement speed of each of the pistons 5L and 5R.

Figure 7:
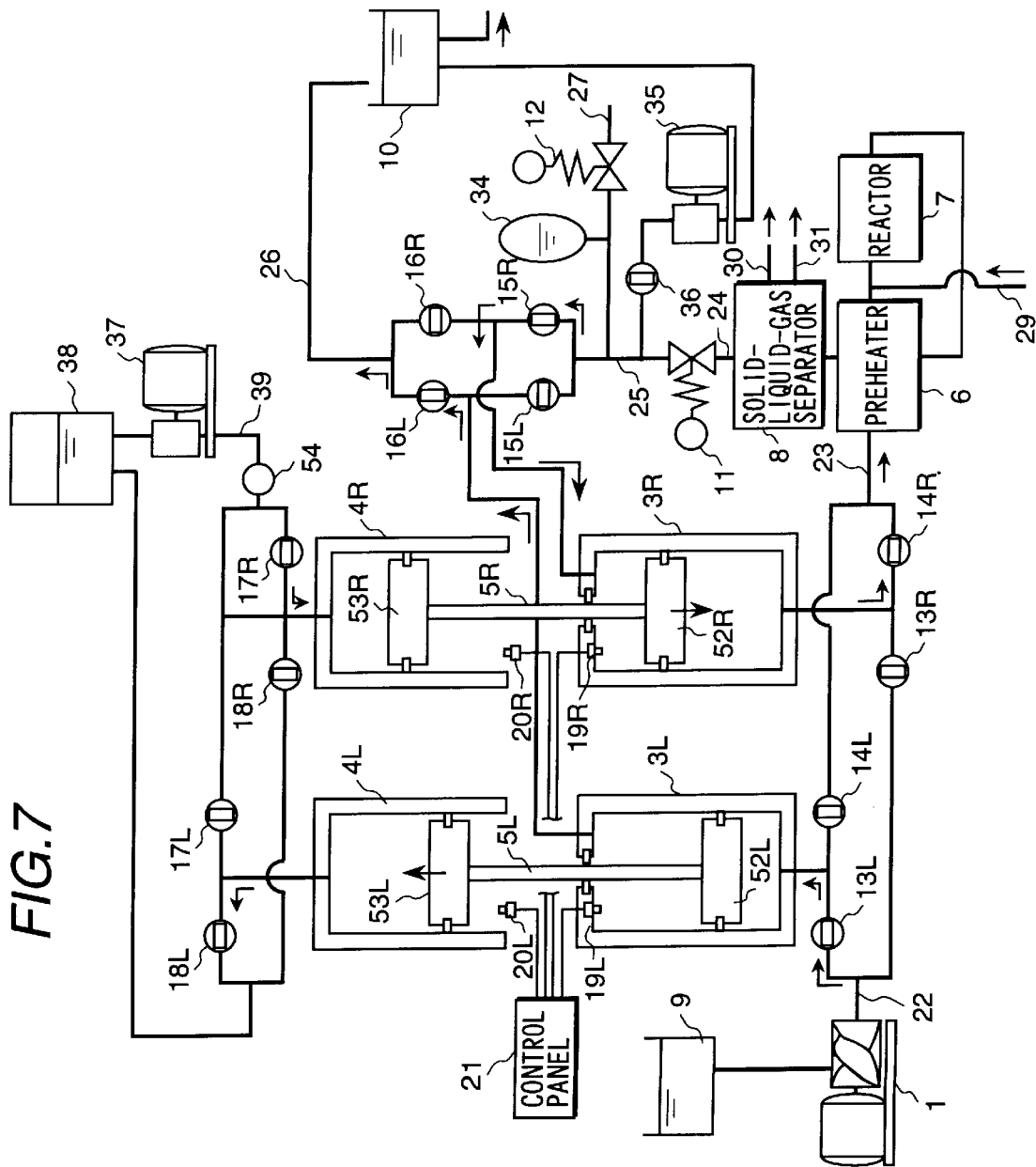
FIG. 7 is a schematic block diagram showing the composition of an organic substance processing system of another embodiment according to the present invention.

FIG. 7 shows the composition of an organic substance processing system of another embodiment according to the present invention. This embodiment differs from the embodiment shown in FIG. 1 in that the processed high-pressure water 25 is introduced into the secondary cylinders 3L and 3R into which the slurry 22 before processing is fed.

Describing in more detailed, the slurry 22 is introduced into each of the secondary cylinders 3L and 3R from the bottom of each cylinder in the same manner as carried out in the embodiment shown in FIG. 1. Further, the processed high-pressure water 25 is introduced into the space on the back side of each of the pistons 52L and 52R of the respective secondary cylinders 3L and 3R from the top of each secondary cylinder. Furthermore, the operation-water 39 discharged from the flow control pump 37 is introduced into the primary cylinders 4L and 4R into which the processed high-pressure water is introduced in the embodiment shown in FIG. 1.

According to this embodiment, unlike the embodiment shown in FIG. 1, since the operation-water 39 does not contact the slurry 22, the operation-water 39 is not contaminated by the slurry 2. Therefore, it is possible to use operational-oil as operational-fluid in place of the operational-water 28. In the embodiment shown in FIG. 7, the operational-oil 39 is used, and an operation-oil tank 38 is provided. By using the operation-oil 39, the freedom of selection in setting the cross-sectional area of each of the cylinders 4L and 4R. For example, each cross-sectional area can be determined based on the relationship between the flow rate and the discharge pressure of the flow control pump 37.

Here, the operational procedures of the valves 15L, 15R, 16L, and 16R for controlling the paths of the processed high-pressure water 25, and the valves 17L, 17R, 18L, and 18R for controlling the paths of the operation-oil 39 are the same as those in the embodiment shown in FIG. 1.

Figure 8:
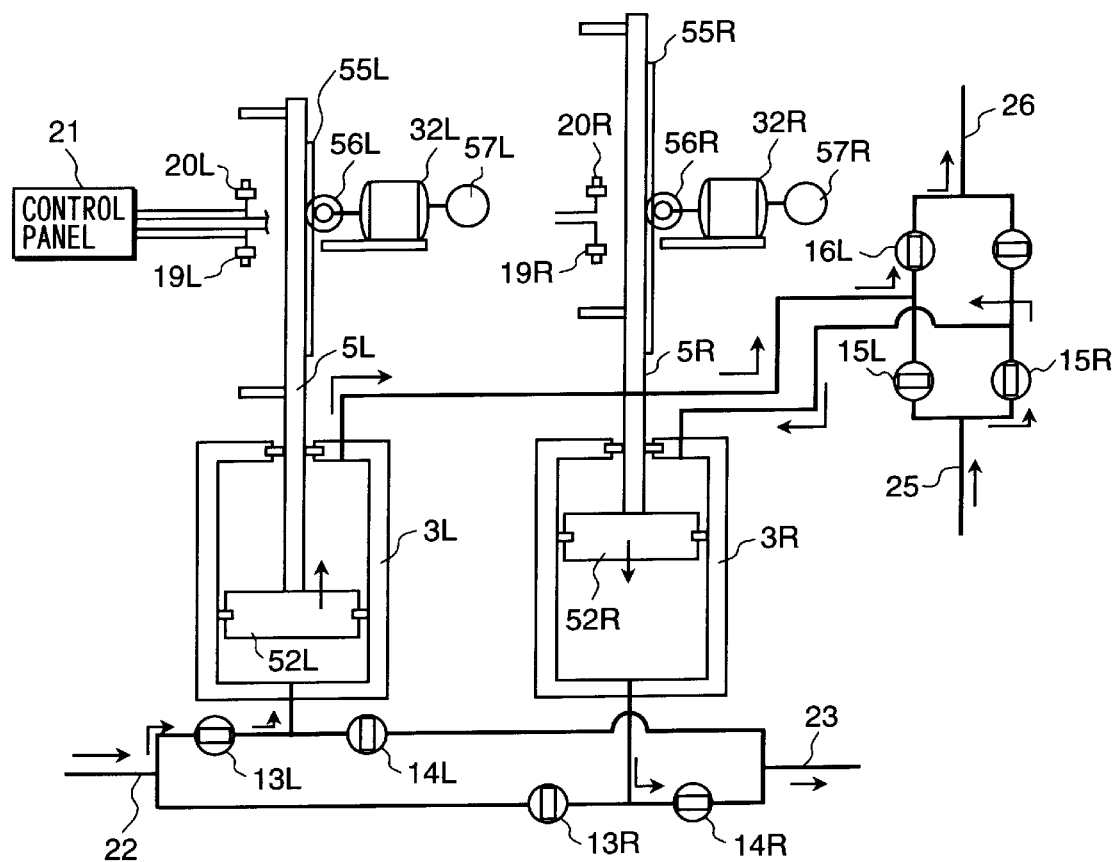
FIG. 8 is a schematic block diagram showing the composition of a modified organic substance processing system of the embodiment shown in FIG. 7.

FIG. 8 shows the composition of a modified organic substance processing system of the embodiment shown in FIG. 7. This modified organic substance processing system is different from the embodiment shown in FIG. 7 in that a motor is used in place of the flow control pump 37. The racks 55L and 55R are attached onto the piston rods 5L and 5R. By engaging the pinions 56L and 56R attached to the rotation axes of the motors 32L and 32R with the racks 55L and 55R, respectively, the rotation force of each motor is transmitted to the corresponding one of the pistons 52L and 52R. The top and bottom-dead-points of each of the pistons 52L and 52R are detected using each of the piston rods 5L and 5R.

Figure 9:
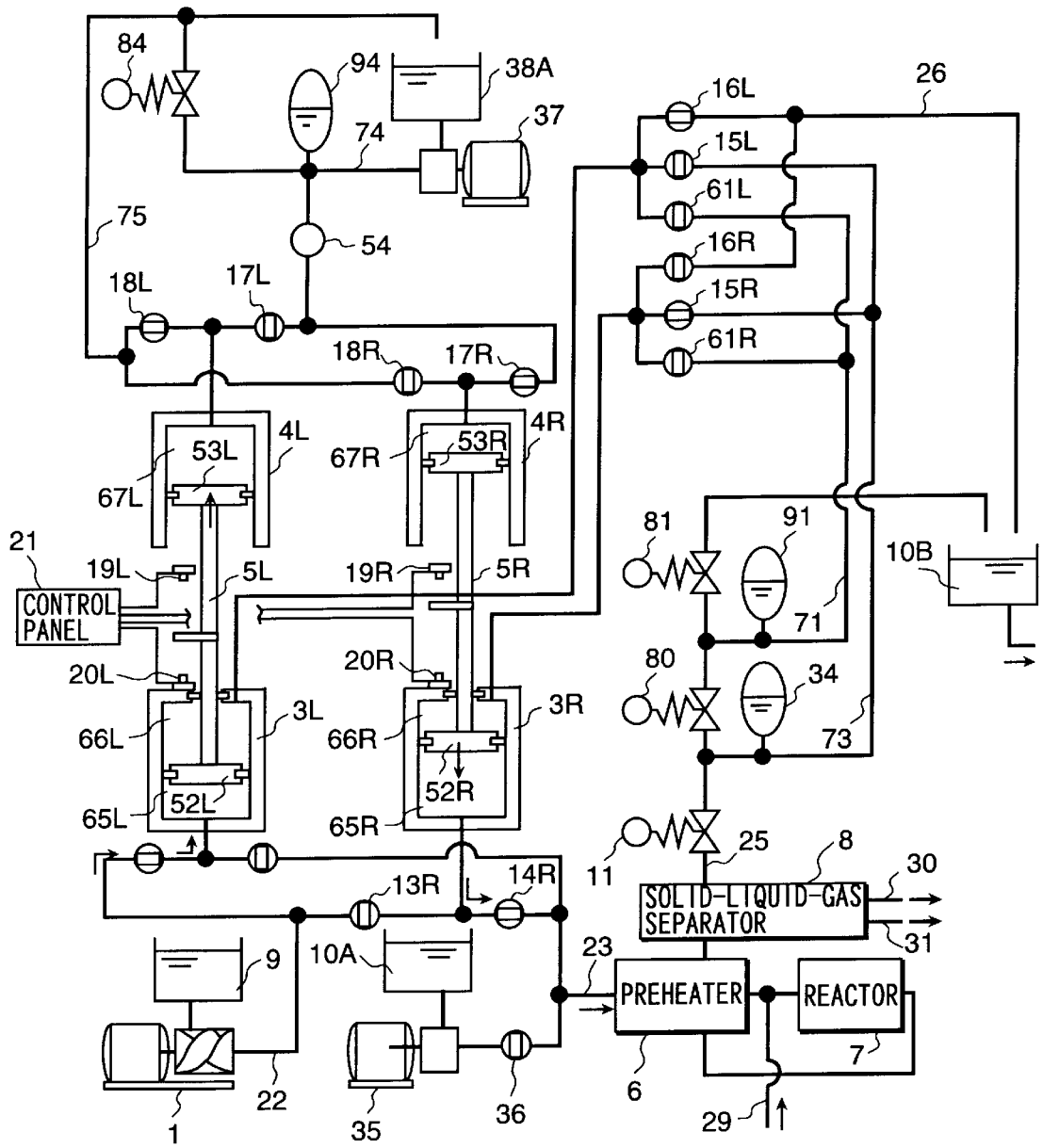
FIG. 9 is a schematic block diagram showing the composition of another modified organic substance processing system of the embodiment shown in FIG. 7.

FIG. 9 shows the composition of another modified organic substance processing system of the embodiment shown in FIG. 7. In this embodiment, changes in the pressure of the processed high-pressure water system is more suppressed. Further, in this embodiment, each of the piston rods 5L and 5R is separated at the middle position, and the separated ones butt against each other, so that the piston rods 5L and 5R do not compose a statically indeterminate structure due to three-point suspension.

The space 65L into which the slurry 22 is sucked and in which the sucked slurry 22 is compressed by the piston 52L and the space 66L (referred as to the chamber 66L) into which the processed high-pressure water 25 is introduced are formed in the secondary cylinder 3L, and the space 67L (referred to as the chamber 67L) into which the operation-water 75 is introduced by the piston 53L is formed in the primary cylinder 4L. Also, the space 65R (referred to as the chamber 65R) into which the slurry 22 is sucked and in which the sucked slurry 22 is compressed by the piston 52R and the space 66R (referred to as the chamber 66R) into which the processed high-pressure water 25 is introduced are formed in the secondary cylinder 3R, and the space 67R (referred to as the chamber 67R) into which the operation-water is introduced by the piston 53R is formed in the primary cylinder 4R.

The processed high-pressure fluid 25 flowing out of the solid-liquid-gas separator 8 is introduced onto the back sides of the pistons 52L and 52R of the secondary cylinders 3L and 3R via the reaction-system-pressure holding valve 11 and the back-pressure holding valves 80 and 81. The lines after the back-pressure holding valve 81 is called a flowing-out-fluid storage chamber pre-pressurization line 71. Moreover, a back-pressure line 73 is provided to introduce the processed high-pressure fluid 25 flowing out of the solid-liquid-gas separator 8 onto the back sides of the pistons 52L and 52R via the reaction-system-pressure holding valve 11 along with the flowing-out-fluid storage chamber pre-pressurization line 71. Also, an high-pressure-fluid expelling line 26 is also provided to return the processed high-pressure fluid expelled from the back sides of the pistons 52L and 52R into the processed water storage tank 10B via the valves 16L and 16R.

The required discharge pressure of the slurry pump 1 is the pressure necessary to transfer the slurry 22 into the secondary cylinders 3L and 3R. If the substances to be processed are liquid, a liquid pump can be used.

FIG. 9 also indicates the notion or operational states of fluid and components in the process of filling-up of the secondary cylinder 3L with the slurry 22. The valve 13L is opened, and the valve 14 is closed. Further, the valves 61L and 15L are closed, and the valve 16L is opened. As the piston 52L rises, the processed high-pressure fluid 25 in the secondary cylinder 3L is returned to the processed water storage tank 10B. The valve 17L is closed, and the valve 18 is opened. Further, the piston 53L is raised, and the operation-water 75 in the primary cylinder 14L is expelled into the operation-water tank 38.

After the flow control pump 37 is operated, the valve 17R is opened, and the valve 18 is closed. The right-hand-side cylinders are in the state of introducing the operation-water 75 into the primary cylinder 4R. The valve 15R is opened, and the valve 16R is closed. Further, the processed high-pressure fluid 25 is introduced into the secondary cylinder 3R, and the back-pressure is applied onto the piston 52R. Furthermore, the valve 13R is closed, and the valve 14R is opened. Thus, the pistons 52R and 53R descend, and the slurry 23 in the secondary cylinder 3R is fed into the preheater 6.

Since the displacements of the respective pistons 52R and 53R are determined by the flow rate of the operation-water flowing into the cylinder 4R, the flow rate of the slurry 23 fed into the preheater 6 is adjusted by controlling the discharge flow rate of the flow control pump 37.

An organic substance processing apparatus created by the inventors was well operated by setting 25 Mpa to the preset pressure of the slurry 22 in the secondary cylinder 3R, 25 Mpa to the back-pressure of the piston 52R, and 3 Mpa to the pressure of the operation-water 75 in the primary cylinder 4R, respectively. Thus, it is proved that the pressure of only 3 Mpa is sufficient to pressurize the slurry 22 to 25 Mpa, which is not yet processed, and a fair amount of energy conservation can be attained.

In an operation-fluid feeding line 74, a pressure-regulation valve 84 is provided to regulate the pressure in the operation-fluid feeding line 74. Moreover, an accumulator 94 is also provided in the operation-fluid feeding line 74, and suppresses the pressure pulsation which may occur in the operation-fluid feeding line 74 when the valves 17L and 17R is closed. Since the back-pressure is applied onto the pistons 52L and 52R in the secondary cylinders 3L and 3R, the back-pressure on the pistons 53L and 53R in the primary cylinders 4L and 4R is not so high. Therefore, since the pressure in the operation-fluid feeding line 74 is also not so high, it is possible to compose the pressure regulation valve 84 and the accumulator 94 such that their withstand pressure is comparatively low.

The processed high-pressure fluid 25 flowing out of the solid-liquid-gas separator 8 is introduced into the processed fluid storage tank 10B via the reaction-system-pressure holding valve 11, the back-pressure-line pressure holding valve 80, and the pre-pressurization-line pressure holding valve 81. A part of the processed high-pressure fluid 25 is introduced into a back-pressure line 73 which is branched from the position between the reaction-system-pressure holding valve 11 and the back-pressure-line pressure holding valve 80. The rest part of the processed high-pressure fluid 25 is introduced into the pre-pressurization line 71 which is branched from the position between the pre-pressurization-line pressure holding valve 81 and the back-pressure-line pressure holding valve 80.

The back-pressure-line pressure holding valve 80 prevents the pressure in the back-pressure line 73 from exceeding the value preset to the pressure holding valve 80. Also, the pre-pressurization-line pressure holding valve 81 prevents the pressure in the pro-pressurization line 71 from exceeding the value preset to the pressure holding valve 81. The pre-pressurization line 71 is provided for pressurizing or depressurizing the spaces on the back sides of the pistons 52L and 52R of the secondary cylinders 3L and 3R, respectively. An excessive amount of the processed high-pressure fluid 25 which has passed through the pre-pressurization-line pressure holding valve 81 is expelled into the processed fluid storage tank 10B.

Since the reaction-system-pressure holding valve 11, the back-pressure-line pressure holding valve 80, and the pre-pressurization-line pressure holding valve 81 are serially connected to each other, even if the pressure in the back-pressure line 73 or the pre-pressurization line 71 changes, the change does not affect the upper stream of each of these lines. When the spaces on the back sides of the pistons 52L and 52R are pressurized, the pressure in the pre-pressurization line 71 decreases. However, the upper stream of the back-pressure line is not affected by this pressure decrease. Since the change in the back-pressure line 73 is small even if the valves 15R and 15L are opened, the reaction-system-pressure holding valve 11 can be omitted.

The accumulator 34 in the back-pressure line 73 suppresses the pressure surge which may occur in the back-pressure line 73. Since this accumulator 34 is required to have a high withstand pressure, a smaller capacity of this accumulator reduces its fabrication cost. Moreover, if the reaction-system-pressure holding valve 11 can be omitted, the solid-liquid-gas separator 8, the reactor 7, and the preheater 6 have the sufficient volumes, respectively, and the change in each of these components is small, this accumulator 34 can be omitted.

In the accumulator 91 provided in the pre-pressurization line 71, the pressure is accumulated while the valves 61L and 61R are closed, and the accumulated pressure is used to pressurize the spaces on the back sides of the pistons 52L and 52R in the secondary cylinders 3L and 3R.

Here, when this organic substance processing system is started, an initial pressurization pump 35 is activated, and a valve 36 is opened. Further, the operation-water in an operation-water tank 10A is fed into the whole reaction-system. After the initial pressurization is completed, the initial pressurization pump 35 is stopped, and the valve 36 is closed.

Figure 10:
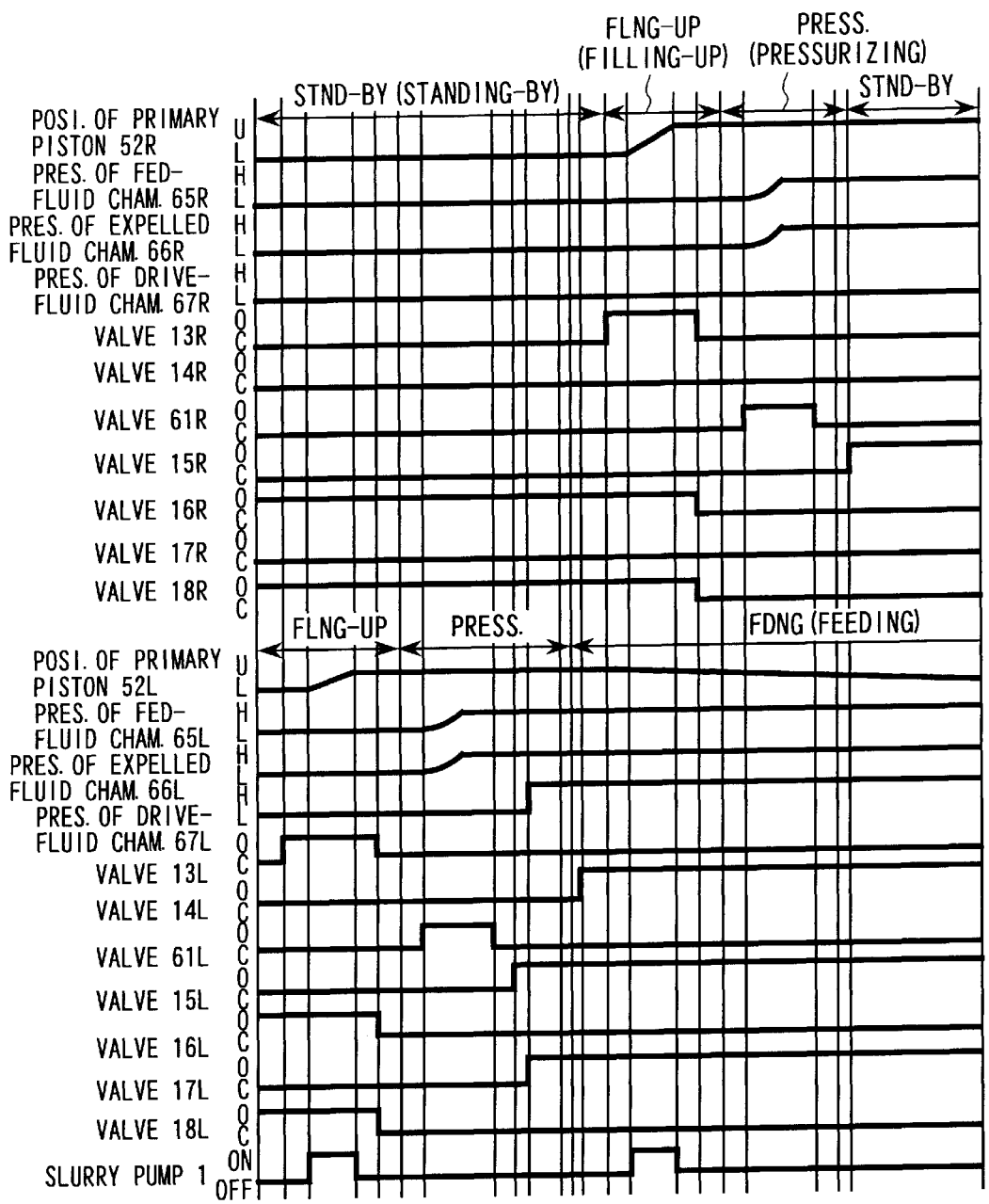
FIGS. 10 and 11 are time charts for depicting the timing of the valve operations in the embodiment shown in FIG. 9.

The staring operations of the processing system shown in FIG. 9 will be explained with reference to FIG. 10. In the initial state, the valves 16R, 16L, 18R, and 18L are opened, and the valves 13L, 13R, 14L, 14R, 15L, 15R, 17L, 17R, 61L, 61R, and 36 are closed. The pressure in the secondary cylinders 3L and 3R, and the primary cylinders 41 and 4R is the same as the atmospheric pressure. At first, the valve 36 is opened, and the initial pump 35 is operated. Next, a heater provided in the reactor 7 is turned on, and the temperature in the reactor 7 is heated to a predetermined temperature.

If the pressure in the system is a predetermined pressure, and the temperature in the reactor 7 is the predetermined temperature, the valve 13L is opened, and the slurry pump 2 is driven. The secondary cylinder 3L is filled up with the slurry 22 stored in the slurry tank 9. During the filling-up of the cylinder 3L with the slurry 22, the pistons 52L and 53L are rising. When the pistons 52L and 53L reach the respective top-dead-points, the detector 19L sends the confirmation signal to the control panel 21. Further, when this signal is input to the control panel 21, the slurry pump 1 is stopped by the control panel 21. The valves 13L, 16L, and 18L are closed, and the valve 61L is opened.

The processed high-pressure fluid 25 in the pre-pressurization line 71 is introduced into the space on the back side of the piston 52L in the secondary cylinder 3L. When the valve 61L is opened, the pressure in the pre-pressurization line temporally decreases. However, since the processed high-pressure fluid is introduced into the pre-pressurization line 71 via the back-pressure-line pressure holding valve 80, the pressure in the pre-pressurization line 71 gradually increases. Moreover, even if the pressure in the pre-pressurization line 71 temporally decreases, the back-pressure-line pressure holding valve 80 prevents this decrease of the pressure from propagating to the upper stream of this pressure holding valve 80. Meanwhile, the preset pressure of the back-pressure-line pressure holding valve 80 is equal to that of the pre-pressurization-line pressure holding valve 81.

When the back-pressure of the piston 52L in the secondary cylinder 3L became the same as that just before the back-pressure-line pressure holding valve 80, the valve 61L is closed, and the valve 15L is opened. In these operations of the valves, the pressure in the upper stream of the reaction-system-pressure holding valve 11 does not change. The timing when the valve 61L is closed, and the valve 15L is opened can also be controlled based on the pressure in the preheater 6. Moreover, this timing can also be controlled based on the increasing extent of the back-pressure on the piston 52L.

Further, the valve 15L is opened, and the flow control pump 37 is driven. The operation-fluid stored in the operation-fluid tank 38A is introduced into the primary cylinder 4L. If the pressure in the primary cylinder 4L exceeds the preset pressure of the operation-fluid-feed-line pressure regulation valve 84, the operation-fluid is returned to the operation-fluid tank 38A. Thus, the pressure in the primary cylinder 4L decreases below the preset pressure of the operation-fluid-feed-line pressure regulation valve 84 again.

Next, the valve 14L is opened, and the slurry 23 in the secondary cylinder 31 is expelled into the preheater 6. When the feeding of the slurry 23 into the preheater 6 begins, the initial pressurization pump 35 is stopped, and the valve 36 is opened. Further, the valve 13R is opened, and the slurry pump 1 is again driven. Furthermore, the secondary cylinder 3R is filled up with the slurry 22 in the slurry tank 9. Hereafter, the right-hand-side cylinders 3R and 4R are operated in the same manner as the left-hand-side cylinders 3L and 4L are operated.

Figure 11:
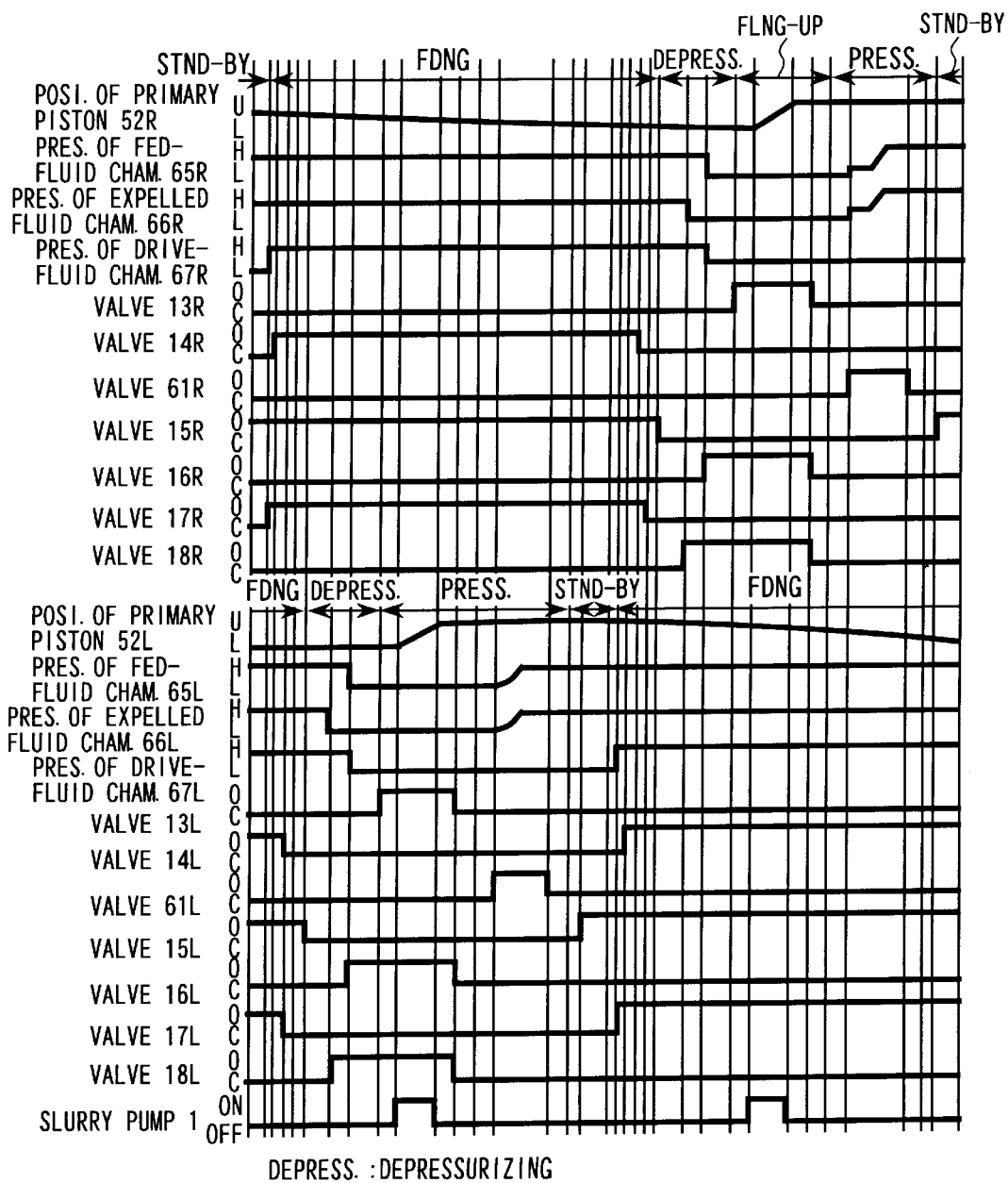

The steady-state operation of the process system shown in FIG. 9 is explained below with reference to FIG. 11. In the state shown in FIG. 11, the piston 52R in the right-hand-side cylinder 3R is positioned at the top-dead-point. The inside chambers of the cylinders 3R and 4R are pressurized. The valve 15R is opened, and the valves 13R, 14R, 16R, 61R, 17R, 18R are closed. In this state, the high-pressure slurry 23 is being fed to the preheater 6 from the left-hand-side cylinder 3L. The valves 14L, 15L, and 17L are opened, and the valves 13L, 61L, 16L, and 18L are closed. The piston 52L is gradually descending. When the piston 52L reaches its bottom-dead-point, the detector 20L sends the confirmation signal to the control panel.

When the control panel 21 receives the signal indicating that the piston 52L has reached the top-dead-point, the control panel 21 opens the valves 15R and 14R, and closes the valves 14L and 15L. After these operations, a cylinder into which the slurry 22 is fed is switched from the left-hand-side cylinder 3L to the right-hand-side cylinder 3R. Here, slightly before the feeding of the slurry 23 into the preheater 6 from the left-hand-side cylinder 3L is stopped, the feeding of the slurry 23 into the preheater 6 from the right-hand-side cylinder 3R is started. Accordingly, the switching of the slurry feed mode becomes smooth. Here, the flow control pump 37 continues to discharge the operation-water 75 at a constant flow rate while the switching of the slurry feed mode is switched. Therefore, the flow rate of the slurry 23 fed into the preheater 6 is kept constant.

When a cylinder which feeds the high-pressure slurry 23 is switched from the left-hand-side cylinder 3L to the right-hand-side cylinder 3R, the pressure in the primary cylinder 4L is returned to the same as the atmospheric pressure by opening the valve 18L. Next, the valve 16L is opened, and the pressure in the secondary cylinder 3L is returned to the atmospheric pressure level. By the above procedures, the insides of the cylinders 4L and 3L can be depressurized so that an excessive force is not applied to the piston rod 5L.

Further, the valve 13L is opened, and the slurry pump 1 is started. Hereafter, the left-hand-side cylinder 3L perform the filling-up process, and the right-hand-side cylinder 3R performs the pressurizing process. Then, in the same manner as described above, the slurry 22 is pressurized, and is fed into the preheater 6.

According to this modified processing system, a specialized high-pressure pump is not necessary. Moreover, since the pressure of the processed high-pressure fluid 25 is utilized to pressurize the slurry 22 and feed it into the reactor 7, the energy can be saved. Furthermore, since the space on the back side of the piston of each secondary cylinder is pre-pressurized by the pre-pressurization line 71 provided downstream from the back-pressure-line pressure holding valve 80, changes in the pressure in the preheater 6, the reactor 7, and the solid-liquid-gas separator 8 can be prevented.

Figure 12:
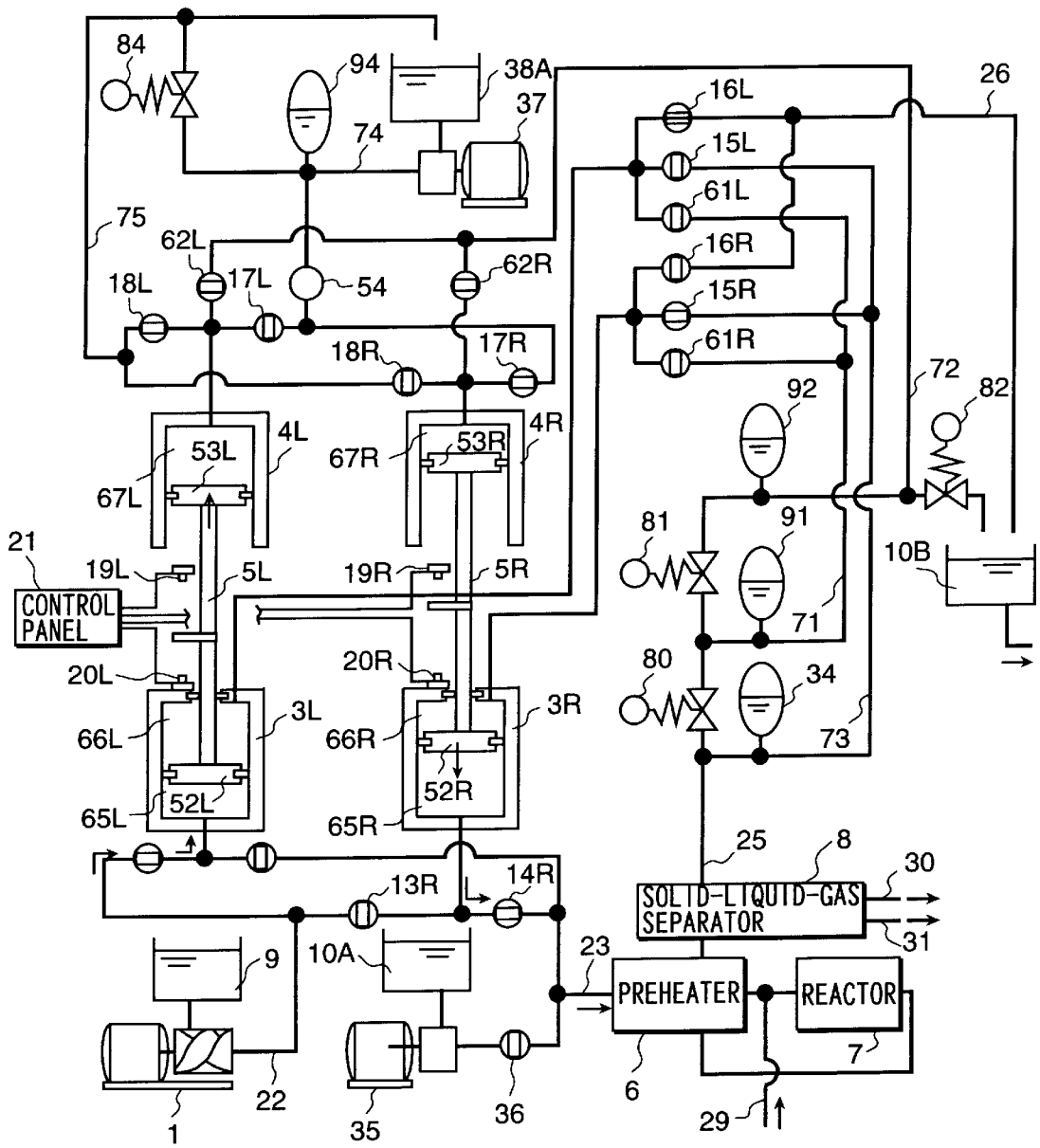
FIG. 12 is a schematic block diagram showing the composition of still another modified organic substance processing system of the embodiment shown in FIG. 9.

FIG. 12 is a schematic block diagram showing the composition of still another modified organic substance processing system in which another pre-pressurization line 72 is added to the processing system shown in FIG. 9. This pre-pressurization line 72 is used to pre-pressurize the primary cylinders 4L and 4R from the atmospheric pressure to the pressure with which the slurry 23 is fed to the preheater 6. The pressure in the pre-pressurization line 72 is controlled by the pre-pressurization-line pressure holding valve 82. The pressure preset to this pressure holding valve 82 is set as a value approximately equal to the pressure with which the slurry is fed from the secondary cylinders 3L and 3R to the preheater 6. For example, if the pressure in the secondary cylinders 3L and 3R is 3 Mpa when the slurry 23 is fed to the preheater 6, 3 Mpa is also set to the preset pressure of the pre-pressurization-line pressure holding valve 82.

The pressure is accumulated in an accumulator 92 while the valves 62L and 62R are closed, and the accumulated pressure is used to pressurize the back sides of the pistons 52L and 52R. Meanwhile, this accumulator 92 is not indispensable.

Figure 13:
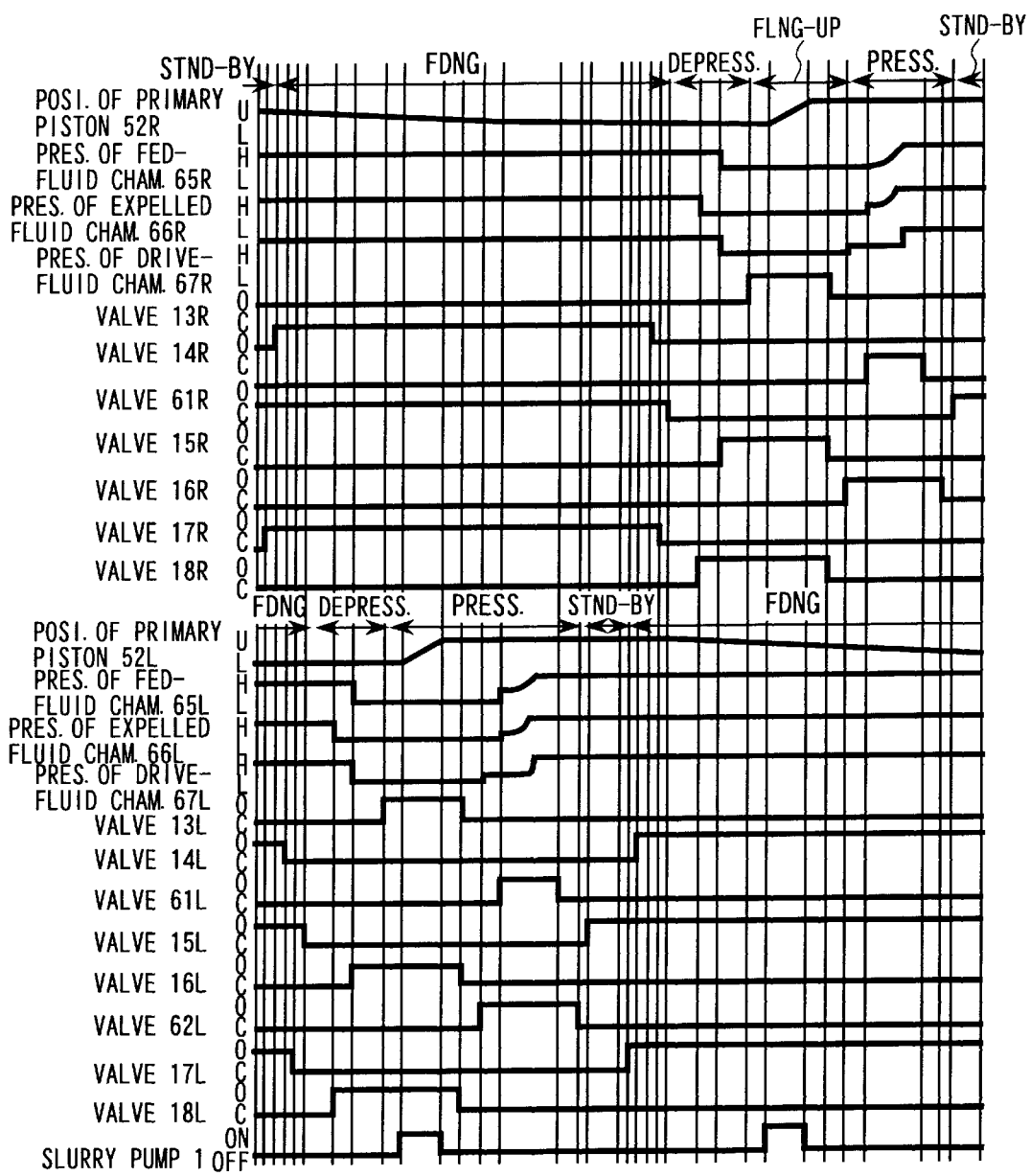
FIG. 13 is a time chart for explaining the timing of the valve operations in the embodiment shown in FIG. 12.

An example of the valve opening/closing procedures in this modified processing system is shown in FIG. 13. Since the valve opening/closing procedures in this modified processing system is different from those in the modified processing system shown in FIG. 9 only in the pressurizing process, only the procedures of the pressurizing process are explained below. The slurry 22 is pressurized by the right-hand-side cylinder 3R.

The valve 62R is opened, and the processed high-pressure fluid accumulated in the accumulator 92 is fed into the primary cylinder 4R. Further, the valve 61R is opened, and the processed high-pressure fluid 25 accumulated in the accumulator 91 provided in the pre-pressurization line 71 is introduced onto the back side of the piston 52R in the secondary cylinder 3R. The pressure in the secondary cylinder 3R is increased to the preset pressure of the pre-pressurization-line pressure holding valve 81 by the pressure of the processed high-pressure fluid 25 which has passed through the back-pressure-line pressure holding valve 80, and has by-passed the pre-pressurization-line pressure holding valve 81.

If the processed high-pressure fluid 25 is high, and it exceeds the preset pressure of the pre-ressurization-line pressure holding valve 81, the pressure in the processed high-pressure fluid 25 is adjusted to the preset pressure of the pre-pressurization-line pressure holding valve 82, and this adjusted pressure is applied onto the back side of the piston 52R in the secondary cylinder 3R. The preset pressure of the pre-pressurization-line pressure holding valve 82 is set as a value approximately equal to the pressure with which the slurry is fed into the preheater 6. By the above-described composition, it is prevented that the pressure in the operation-fluid 75 changes when the valves 17L and 17R are opened/closed. Accordingly, it is prevented that the flow rate of the slurry 23 fed into the preheater 6 changes.

Although the slurry 22 of the mixture of water and organic substances is processed in each of the embodiments, the organic substance processing system according to the present invention can process the mixture of organic substances and fluid other than water. Also, although the oxidation reaction is used in the reactor 7, and oxygen is fed into the reactor 7, if the hydrolysis reaction is used, it is not necessary to feed oxygen into the reactor 7. If the fluid which has been processed is only liquid, the solid-liquid-gas separator 8 is not necessary.

As described above, in accordance with the present invention, since the pressure in the fluid which is processed at a high temperature and a high pressure is utilized, organic substances can be processed with a comparatively small amount of power without a high-pressure slurry pump. Furthermore, it is possible to process the slurry containing organic substances, independent of the content of the organic substances.

Since a plurality of cylinders are alternately used for slurry-pressurization and slurry-feed, the high-pressure slurry can be continuously fed to a reactor.

Since the pulsation in the flow rate of the slurry fed into a reactor is suppressed, the reaction in the reactor is stable, which makes the system performance of processing organic substances stable. ??

What is claimed is:

1. An organic substance processing system for processing organic substances in a reactor by pressurizing fluid which contains organic substances with a plurality of cylinders including pistons, respectively, and by feeding said pressurized fluid into said reactor, said organic substance processing system comprising:
   a first chamber formed on one side of each cylinder, into which said fluid containing said organic substances is introduced; and
   a second chamber formed on the other side of said cylinder, into which processed high-pressure fluid is introduced, said organic substances in said fluid having been processed;
   wherein, by alternately changing the timing of pressurizing said fluid which contains said organic substances in each cylinder, said pressurized fluid is continuously fed to said reactor.

2. An organic substance processing system according to claim 1, wherein pressure holding means for maintaining the pressure in said second chamber into which said processed fluid is introduced, said organic substances in said fluid having been processed, and while one of said plurality of said cylinders feeds said fluid which has not yet been processed into said reactor, at lease one of the rest cylinders is being filled up with said fluid which has not yet been processed, and this fluid is then pressurized in said at least one of the rest cylinder.

3. An organic substance processing system according to claim 2, wherein said pressure holding means is provided between said reactor and said second chamber into which said processed high-pressure fluid is introduced.

4. An organic substance processing system comprising:
   cylinders including pistons, into which processed high-pressure fluid is introduced, organic substances contained in said processed high-pressure fluid having been processed;
   feed means for feeding said fluid which has not yet been processed into said cylinders;
   main pressurization means for pressurizing said fluid with a piston, which has not yet been processed, in at least one of said cylinders by introducing said processed high-pressure fluid into said cylinder;
   auxiliary pressurization means for pressurizing said fluid which has not yet been processed in said cylinder along with said main pressurization means; and
   pressure holding means for keeping the pressure of said fluid which has been processed at a predetermined pressure.

5. An organic substance processing system according to claim 4, wherein said pressure holding means includes a back-pressure valve, and said processed high-pressure fluid is introduced into said cylinder after at least one of the pressure and the flow rate of said processed high-pressure fluid is reduced by said back-pressure valve.

6. An organic substance processing system according to claim 4, including a processing apparatus into which said pressurized fluid before processing is fed and which generates said processed high-pressure; and at least one pair of said cylinders;
   wherein the timing of filling-up and feeding of said fluid before processing in said pair of said cylinders is alternately changed, and by introducing said processed high-pressure fluid into said cylinders with said main pressurization means, said fluid containing said organic substances is continuously fed into said processing apparatus.

7. An organic substance processing system according to claim 4, wherein each cylinder is partitioned into two chambers on both sides of said piston in said cylinder, said main pressurization means is connected to one chamber, said feed means is connected to the other chamber, and a piston swept volume of said chamber to which said main pressurization means is connected is smaller than that of said chamber to which said feed means is connected.

8. An organic substance processing system according to claim 4, wherein said pressure holding means includes a back-pressure valve for depressurizing said processed high-pressure fluid and introducing said fluid into said cylinder; each cylinder is partitioned into two chambers on both sides of said piston in said cylinder; said main pressurization means is connected to one chamber; said feed means is connected to the other chamber; a piston swept volume of said chamber to which said main pressurization means is connected is larger than that of said chamber to which said feed means is connected; a high-pressure pump is provided in said auxiliary pressurization means; and fluid pressurized by said high-pressure pump is introduced into one of said two chambers.

9. An organic substance processing system according to claim 4, wherein said cylinder includes a primary cylinder into which said processed high-pressure fluid is introduced and a secondary cylinder into which said fluid containing said organic substances before processing is introduced; a primary piston is provided in said primary cylinder; a secondary piston is provided in said secondary cylinder; and said primary and secondary pistons are connected to each other with a piston rod.

10. An organic substance processing system according to claim 9, wherein a piston-rod-side chamber is formed on the back side of said secondary piston in said secondary cylinder; said piston rod is penetrating said secondary cylinder from the side of said piston-rod-side chamber to the outside of said secondary cylinder in a watertight state; and said fluid pressurized by said auxiliary pressurization means is fed into said piston-rod-side chamber.

11. An organic substance processing system according to claim 9, including a motor for driving said piston rod and transmission means for transmitting rotational force of said motor to said piston rod.

12. An organic substance processing system comprising:
   a cylinder including a piston for pressurizing fluid containing organic substances, which has not yet been processed;
   main pressurization means for introducing processed high-pressure fluid into said piston, which has been processed;
   auxiliary pressurization mans for pushing said piston along with said main pressurization means;
   a back-pressure line for introducing said processed high-pressure fluid into one of two chambers in said cylinder partitioned by said piston;

a back-pressure-line pressure holding valve for keeping the pressure in said back-pressure line below a predetermined pressure by expelling a part of said high-pressure fluid which has been processed from said back-pressure line when the pressure in said back-pressure line exceeds said predetermined pressure;

a pre-pressurization line for introducing said part of said processed high-pressure fluid expelled from said back-pressure line into said chamber in said cylinder partitioned by said piston; and a pre-pressurization-line pressure holding valve for keeping the pressure in said pre-pressurization line below a predetermined pressure by expelling a part of said processed high-pressure fluid from said pre-pressurization line when the pressure in said pre-pressurization line exceeds said predetermined pressure.

13. An organic substance processing system according to claim 12, wherein said back-pressure line includes first valve means; said pre-pressurization line includes second valve means; and when said chamber in said cylinder is pressurized from a state of the atmospheric pressure, said back-pressure line is closed by said first valve means, and said pre-pressurization line is opened by said second valve means.

14. An organic substance processing system according to claim 12, including a fluid feeding pump for feeding fluid which has not yet been processed into the other one of said two chambers in said cylinder partitioned by said piston; first valve means provided in said back-pressure line; and second valve means provided in said pre-pressurization line; wherein when said fluid which has not yet been processed is fed into said other one of said two chambers in said cylinder, said back-pressure line is opened by said first valve means, and said pre-pressurization line is closed by said second valve means.

15. An organic substance processing system according to claim 12, wherein a reactor for processing said fluid pressurized in said cylinder is provided; a reaction-system-pressure holding valve is provided between said reactor and said back-pressure-line pressure holding valve; said processed high-pressure fluid expelled from said reaction-system-pressure holding valve is introduced into said back-pressure line.

16. An organic substance processing system according to claim 12, including a different piston connected to said piston via a piston rod; a different cylinder including said different piston; a pressurization pump for introducing pressurized operation-fluid into said different cylinder; a different pre-pressurization line for introducing said processed high-pressure fluid expelled from said pre-pressurization-line pressure holding valve into said different cylinder; and a different pre-pressurization-line pressure holding valve; wherein when said different cylinder is pressurized from a state of the atmospheric pressure, the inside of said different cylinder is pressurized by said processed high-pressure fluid which has passed through both said reaction-system-pressure holding valve and said pre-pressurization-line pressure holding valve.

17. An organic substance processing system according to claim 13, wherein a reactor for processing said fluid pressurized in said cylinder is provided; a reaction-system-pressure holding valve is provided between said reactor and said back-pressure-line pressure holding valve; said processed high-pressure fluid expelled from said reaction-system-pressure holding valve is introduced to said back-pressure line.

18. An organic substance processing system according to claim 15, wherein an accumulator is provided in said back-pressure line.

19. An organic substance processing system according to claim 17, wherein an accumulator is provided in said back-pressure line.

\* \* \* \* \*